(12) United States Patent
Ikeda et al.

(10) Patent No.: US 6,730,259 B1
(45) Date of Patent: May 4, 2004

(54) METHOD FOR STRETCH BLOW MOLDING WIDE-MOUTHED CONTAINER

(75) Inventors: Kenji Ikeda, Nagano-ken (JP); Takashi Shimogata, Nagano-ken (JP)

(73) Assignee: A.K. Technical Laboratory, Inc., Nagano-ken (JP)

( * ) Notice: Subject to any disclaimer, the term of this patent is extended or adjusted under 35 U.S.C. 154(b) by 521 days.

(21) Appl. No.: 09/697,418

(22) Filed: Oct. 26, 2000

(30) Foreign Application Priority Data

Oct. 29, 1999 (JP) .......................................... 11-310021

(51) Int. Cl.[7] .............................................. B29B 49/12
(52) U.S. Cl. ...................... 264/520; 264/532; 264/534
(58) Field of Search .............................. 264/520, 532, 264/534

(56) References Cited

U.S. PATENT DOCUMENTS

| | | | | |
|---|---|---|---|---|
| 4,863,046 A | * | 9/1989 | Collette et al. ............. | 215/381 |
| 5,129,815 A | | 7/1992 | Miyazawa et al. .......... | 425/529 |
| 5,364,585 A | * | 11/1994 | Takeuchi .................... | 264/520 |
| 6,444,159 B2 | * | 9/2002 | Petre .......................... | 264/520 |

FOREIGN PATENT DOCUMENTS

| | | |
|---|---|---|
| EP | 0 293 485 A1 | 12/1988 |
| EP | 0 322 651 A2 | 7/1989 |
| EP | 0 482 652 A2 | 4/1992 |
| JP | 11 157524 A | 6/1999 |

* cited by examiner

*Primary Examiner*—Suzanne E. McDowell
(74) *Attorney, Agent, or Firm*—Weingarten, Schurgin, Gagnebin & Lebovici LLP

(57) ABSTRACT

A method for stretch blow molding a wide-mouthed container, employing a preliminary stretching before stretch blowing without making an upper body portion thickened so as to thin the wall thickness from the connecting portion between the mouth portion and the body portion, thereby preventing the thickening phenomenon at the subjected portion. A preform having a large diameter mouth portion, a body portion and a bottom portion is injection molded within an injection mold. The preform is released from the injection mold in a state where the inside thereof is still in a high temperature while holding the mouth portion of the preform with a lip mold. Then, the preform is transferred to a blow mold as it is. Before the stretch blow molding step of the preform, a stretching rod is descended in a predetermined length to preliminary stretch the body portion in some extent. After thinning a connecting portion of the upper body portion between the body portion and the mouth portion, the entire body portion is stretch blow molded into a wide-mouthed container.

2 Claims, 2 Drawing Sheets

METHOD FOR STRETCH BLOW MOLDING WIDE-MOUTHED CONTAINER

BACKGROUND OF THE INVENTION

1. Field of the Invention

The present invention relates to a method for stretch blow molding a wide-mouthed container which is used as a packaging container for processed food, confectionery, or the like and which is made of thermoplastic resins.

2. Detailed Description of the Related Art

Stretch blow molded packaging containers which is made of thermoplastic resin and which have a thin wall thickness of a body portion are known. Examples of the thermoplastic resin used therefor includes polyesters, polypropylene and polycarbonate, and particularly bottles for beverages made of polyethylene terephthalate are generally and widely known as so-called "PET bottle".

One of the stretch blow molding methods is a method in which a preform having a mouth portion, a body portion and a bottom portion is injection molded within an injection mold, the perform is released from the injection mold in a state where the inside thereof is still in a high temperature while holding the mouth portion of the preform, which is cooled and solidified, with a lip mold, the preform is transferred to a blow mold as it is, and the preform is stretch blow molded within the blow mold into a container such as a bottle having a thin wall of the body portion.

In such a molding method, the temperature of the outer and inner surfaces of the preform is lowered below an orientation temperature due to cooling during injection molding. After releasing the preform, the outer and inner surfaces of the preform are heated by utilizing the heat inside the preform till performing stretch blow molding to increase the surface temperature to the orientation temperature. At the same time, the temperature inside the preform body portion except the mouth portion held by the lip mold is lowered to the predetermined orientation temperature. After then, stretch blow molding is performed.

By the way, a wide-mouthed container used for a packaging container for jam, peanut butter, candies or the like has a wider mouth portion than a bottle for beverages. Further, because of the shape of the container, outside diameter of the body portion thereof is limited so as to be a slightly larger than that of the mouth portion to some extent. In case where the body portion of the preform for a wide-mouthed container is formed similarly to that for a bottles in a longitudinal direction, since the radial stretching ratio is small, it is difficult to obtain a container of which body portion is made thinner wall by air blowing. In order to solve this problem, a preform for a wide-mouthed container is formed to have a conical-shaped body portion or a truncated-conical-shaped one, thereby enabling of setting the stretching ratio relatively large.

When the preform for such a wide-mouthed container is stretch blow molded after lowering the preform temperature to a set temperature after releasing in a high temperature state, a connecting portion between the mouth portion and the body portion becomes thicker than other portions of the body portion. As a result, thinning of the body portion just below the mouth portion cannot be achieved, and in some cases a ring-shaped thicker portion appears just below the mouth portion. This makes the appearance of the resulted container worse as a packaging container, and it would be considered as a reject.

The reason why this connecting portion becomes thicker is that heat at the connecting portion is transferred to lip mold or blow core inserted into the mouth portion during stretch blowing, resulting in heat loss at the connecting portion. After releasing the preform, it is transferred to the blow mold while holding the mouth portion of the preform with the lip mold. Accordingly, during the transferring after releasing and after transferring the preform within the blow mold, heat exchange between the lip mold and the connecting portion of the body portion which is still in a high temperature state via the mouth portion is still continued. As a result, temperature at the connecting portion is lowered below the temperature of the other body portion which is exposed to the atmosphere, and it is difficult to stretch the connecting portion more than the other body portion.

In order to solve the problems, in the conventional method, the heat loss due to the heat exchange with the lip mold is compensated by increasing the thickness of the associated body portion to increase the heat amount to be held thereby. However, there is a certain limit to increase the wall thickness. For example, if the wall thickness of a preform made of polyethylene terephthalate is 4.0 mm or more, the outer surface where the wall thickness thereof is thickened is whitened during its transferring to the blow mold. This results in a light whitened stain on the container molded by stretch blow molding. Particularly, in such a case where the wide-mouthed container for packaging, as shown in FIG. 4, is formed to have a tapered surface at the upper body portion to be capable of visual inspection of contents from outside therethrough, such a defect would be a fatal damage and deteriorate commodity value thereof. Thus, there is a problem that such a container cannot be commercialized.

SUMMARY OF THE INVENTION

The present invention has been deviced to solve the above mentioned problems for the wide-mouthed container by stretch blow molding, and an object of the present invention is to provide a novel method for stretch blow molding a wide-mouthed container which is capable of stretching the entire body portion including the connecting portion with the mouth portion to a thinner wall thickness by employing a preliminary stretching within a blow mold before stretch blowing without making the upper body portion be thicker.

In order to achieve the above-mentioned object, the present invention is to provide a method for stretch blow molding a wide-mouthed container, comprising the steps of injection molding a preform having a large diameter mouth portion, a body portion and a bottom portion within an injection mold, releasing the perform from the injection mold in a state where the inside thereof is still in a high temperature while holding the mouth portion of the preform, which is cooled and solidified, with a lip mold, transferring the preform to a blow mold as it is, and stretch blow molding the preform into a desired container, wherein before the stretch blowing step of the preform a stretching rod is descended to a predetermined length to preliminary stretch the body portion in some extent, thereby thinning a connecting portion of the upper body portion between the body portion and the mouth portion, and after then the entire body portion is stretch blow molded.

Further, in the present invention, the body portion of the preform is formed in a conical shape in which the body portion is made thicker than the mouth portion and the diameter of the body portion is gradually decreased towards the bottom portion, and the body portion is preliminary stretched to about 10 mm length to thin the wall thickness of the upper body portion.

According to the present invention, the wall thickening phenomenon at the connecting portion between the mouth portion and the body portion of a wide-mouthed container can be improved, thereby enabling to obtain a wide-mouthed container for packaging which has a uniform body wall thickness and a well finished connecting portion. As to the molding step therefor, it is not required to use any additional special means or the like, but a preliminary stretching by a stretching rod in a vertical direction is simply carried out as an additional step before the stretch blow molding step. Accordingly, the present invention is directly applicable to the above-mentioned conventional molding method without increasing the molding cycle, thereby solving the problems as above.

BRIEF DESCRIPTION OF THE DRAWINGS

The above and other objects, features and advantages of the present invention will be apparent from the following detailed description of the preferred embodiments of the invention in conjunction with the accompanying drawings, in which.

PREFERRED EMBODIMENTS OF THE INVENTION

Figure 1:
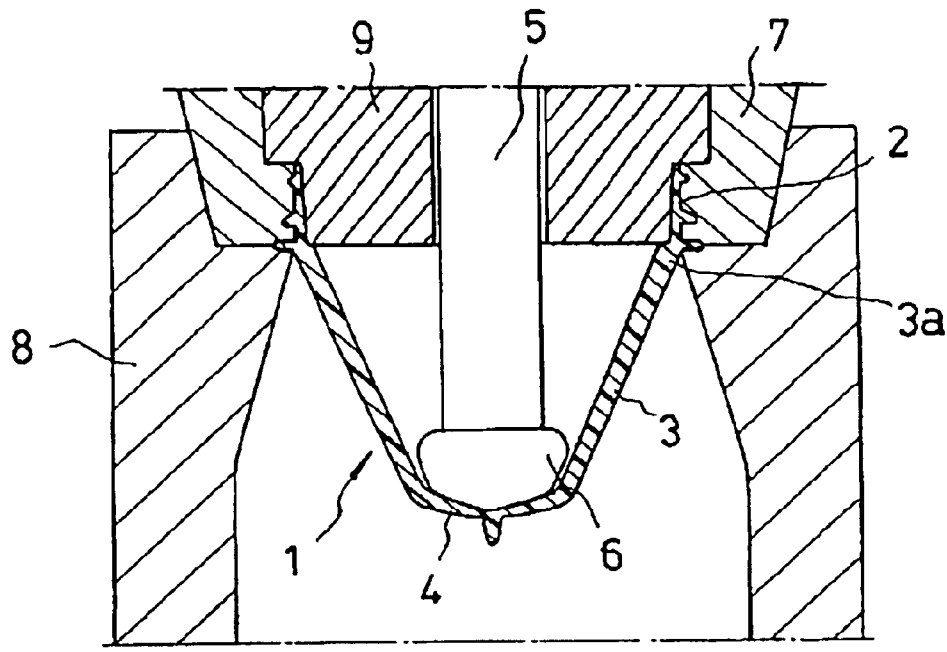
FIG. 1 is an explanatory view showing a step of a method for stretch blow molding a wide-mouthed container according to the present invention, in which a preform is set within a blow mold before preliminary stretching shown as a longitudinal cross section.
Figure 2:
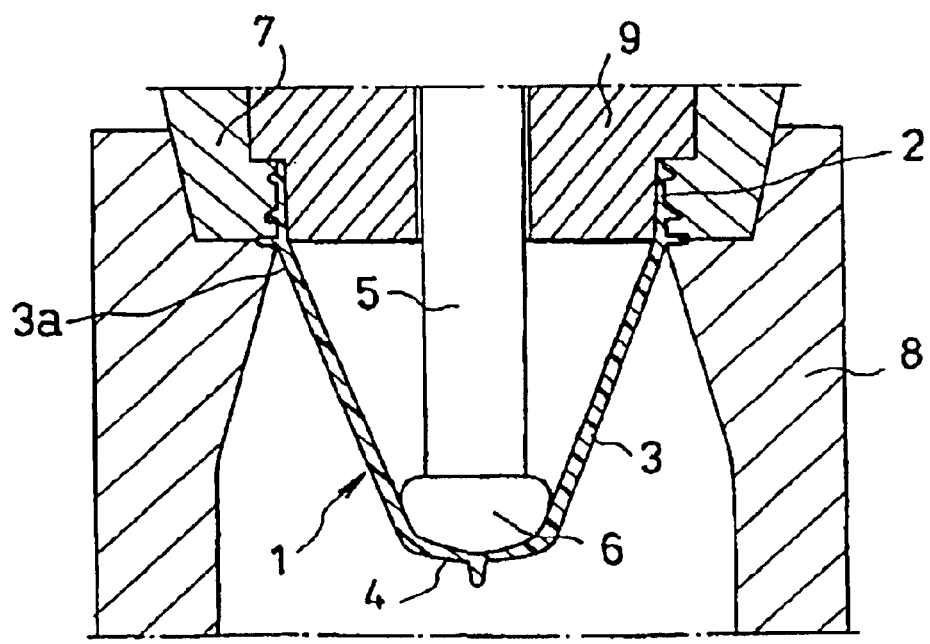
FIG. 2 is a longitudinal cross section of the preform within the blow mold after preliminary stretching.

Preferred embodiments of the present invention will now be described in detail below with reference to the accompanying drawings. Besides, the present invention is not limited thereto.

In the drawings, reference numeral 1 denotes a preform for a wide-mouthed container. The preform 1 includes a mouth portion 2, and a body portion 3 having a bottom portion. The diameter of the mouth portion 2 is about 70 mm and the thickness thereof is about 1.5 mm. The body portion 3 is integrally formed with the mouth portion 2 from its lower edge to have a height of 50 mm and the thickness of the body portion is about 3.4 to 3.9 mm. In the present embodiment, polyethylene terephthalate is used as a thermoplastic resin.

This body portion 3 is formed to have a thin wall from a connecting portion 3a of the mouth portion 2 to the bottom portion 4. The body portion 3 is made in a conical shape by gradually decreasing its diameter toward the bottom portion. The inside bottom surface of the bottom portion 4 is made in a circular plane to abut a tip end member 6 of a stretching rod 5.

Figure 4:
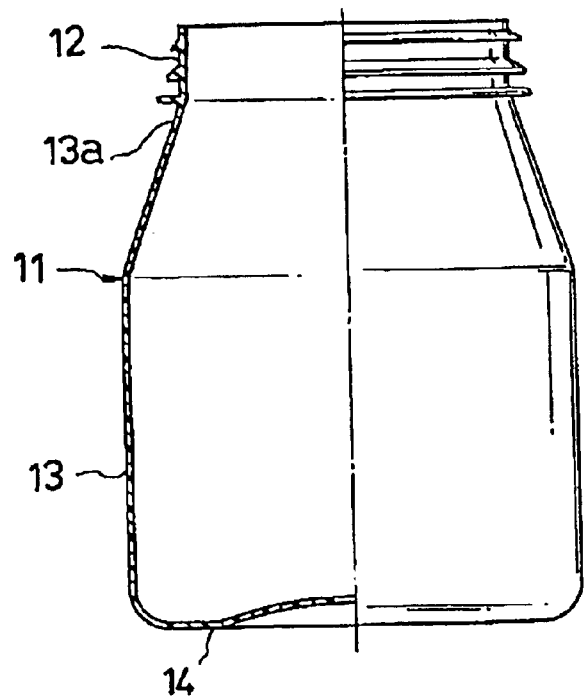
FIG. 4 is a half of a longitudinal cross sectional front view of a wide-mouthed container prepared by the stretch blow molding method according to the present invention.

The preform 1 having a configuration above is formed by injection molding similar to the prior art. During injection molding, a skin layer is formed inside and outside surfaces of the preform by cooling by means of an injection mold. The preform is released in a high temperature state while the formed skin layer maintains the shape of the preform. The preform is transferred into a blow mold 8 while the neck portion (or mouth portion 2) which is cooled and solidified is held with the neck mold 7. After closing the mold, a blow core 9 equipped with the stretching rod 5 is hermetically inserted above into the mouth portion, thereafter stretch blow molding is carried out to form a wide-mouthed container 11 shown in FIG. 4.

The stretch blow molding is carried out after waiting (for about 2 seconds) till the temperature of the body portion except for the mouth portion 2 of the preform 3 be lowered to a predetermined orientation temperature. During the stand-by, the heat at the upper body portion is decreased due to cooling by the lip mold 7 and the blow core 9 and the temperature at the associated portion is lower than the other body portion 3. As a result, it would be difficult for the portion to be stretched. In order to solve this problem, during the stand-by time interval the stretching rod 5 is descended so as that the body portion 3 is preliminary stretched longitudinally before the upper body portion is excessively cooled. The length for preliminary stretching may be sufficiently about 10 mm, thereby undesirable thickened wall thickness at the upper body portion can be decreased.

Figure 3:
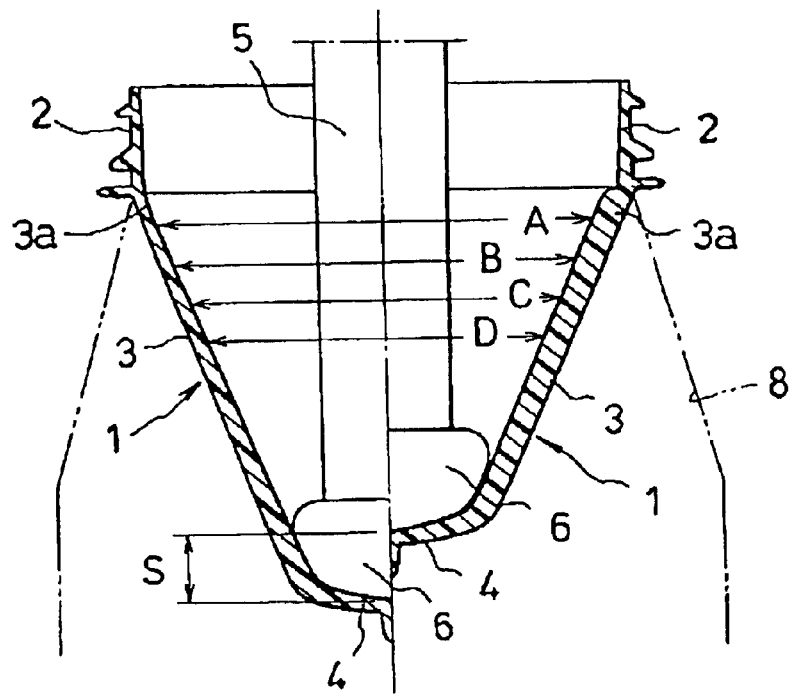
FIG. 3 is a longitudinal cross section of the preform showing its wall thickness change by the preliminary stretching.

FIG. 3 shows the change in wall thickness before stretching (right side drawing) and after stretching (left side drawing). The below-mentioned table shows the change amount of the wall thickness at respective measuring positions (four positions) of A-D at a 5 mm interval from the inner lower end of the mouth portion 2. Besides, the stretching length (S) is 10 mm and the length at each of the measuring positions is measured from the inner lower end of the mouth portion 2.

|  | A | B | C | D |
|---|---|---|---|---|
| Measuring position (mm) | 5 | 10 | 15 | 20 |
| Thickness before stretching (mm) | 3.83 | 3.77 | 3.54 | 3.45 |
| Thickness after stretching (mm) | 2.24 | 2.83 | 3.26 | 3.43 |
| Decreasing rate (%) | 41.3 | 25.0 | 8.0 | 0.5 |

According to the results, preliminary stretching the preform to 10 mm does not affect the entire body portion to be stretched uniformly, but the stretched portion is concentrated at the upper body portion from the inner lower end of the mouth portion 2 to the portion below about 10 mm in length, thereby thinning the portion.

After performing such a preliminary stretching, successively or after a predetermined time has passed, the stretching rod 5 is extended to the bottom surface of the blow mold 8 while a high pressure air is blown from the blow core. As a result, since the heat amount held by the lower body portion is large due to the difference in the above-mentioned thickness, longitudinal stretching of the lower body portion precedes to be thinned. The temperature at the stretched portion is lowered, resulting in disappearing of the temperature difference between the preliminary thinned upper body portion and the lower body portion. Accordingly, during the stretching process the upper body portion is also longitudinally stretched.

Radial expansion stretching is achieved by introducing blowing air at the same time of the longitudinal stretching, and the upper body portion is further stretched from the connecting portion of the mouth portion to be thinned. This expansion stretching is expanded from the upper body portion to the lower body portion so as to go along with the longitudinal stretching by the stretching rod 5, and finally, the entire body portion is thinned in a predetermined thickness distribution to form a container body portion 13.

As a result, the wall thickening phenomenon at the connecting portion 13*a* in a wide-mouthed container 11 which conventionally tends to occur can be improved, thereby enabling to form a container body portion 13 having an almost uniform thickness from the lower end of the container mouth portion 12 to the container bottom portion 14 and also to obtain a wide-mouthed container 11 for packaging which has a uniform body wall thickness and a well finished connecting portion. Further, there is no need to use any specific means or device in the molding process, and it is sufficient for the purpose to preliminary stretch a preform in a longitudinal direction by a stretching rod before stretch blowing. Accordingly, the present invention can be directly applied to a conventional molding method without increasing a molding cycle.

While there has been described what are at present considered to be preferred embodiments of the invention, it will be understood that various modifications may be made thereto, and it is intended that the appended claims cover all such modification as fall within the true spirit and scope of the invention.

What is claimed is:

1. A method for stretch blow molding a wide-mouthed container, comprising the steps of: injection molding a preform having a large diameter mouth portion, a body portion and a bottom portion within an injection mold and wherein the body portion is formed in a conical shape in which the body portion is made thicker than the mouth portion and the diameter of the body portion is gradually decreased towards the bottom portion and the body portion is formed by gradually decreasing its wall thickness from a connecting portion towards the bottom portion; releasing the preform from the injection mold in a state where the inside thereof is still in a high temperature while holding the mouth portion of the preform which is cooled and solidified with a lip mold; transferring the preform to a blow mold as it is; and stretch blow molding the preform into a desired container, wherein before the stretch blow molding step of the preform a stretching rod is descended to a predetermined length to preliminary stretch the body portion to some extent, thereby thinning a wall thickness of the upper body portion, and after then the entire body portion is stretch blow molded.

2. The method for stretch blow molding a wide-mouthed container according to claim 1, wherein the body portion is preliminary stretched to about 10 mm length to thin the wall thickness of the upper body portion.

* * * * *